United States Patent
Wässingbo (10) Patent No.: US 11,050,874 B2
(45) Date of Patent: Jun. 29, 2021

(54) METHOD FOR ARRANGING A MEETING AND A NON-TRANSITORY COMPUTER-READABLE RECORDING MEDIUM

(71) Applicant: Sony Mobile Communications Inc., Tokyo (JP)

(72) Inventor: Tomas Wässingbo, Malmö (SE)

(73) Assignee: Sony Network Communications Europe B.V., Hoofddorp (NL)

( * ) Notice: Subject to any disclaimer, the term of this patent is extended or adjusted under 35 U.S.C. 154(b) by 542 days.

(21) Appl. No.: 15/014,446

(22) Filed: Feb. 3, 2016

(65) Prior Publication Data
US 2017/0180543 A1  Jun. 22, 2017

Related U.S. Application Data (63) Continuation of application No. PCT/IB2015/059660, filed on Dec. 16, 2015.

(51) Int. Cl.
*H04M 1/725* (2021.01)
*G06Q 10/10* (2012.01)
(Continued)

(52) U.S. Cl.
CPC ...... *H04M 1/72566* (2013.01); *G06Q 10/109* (2013.01); *G06Q 10/1093* (2013.01);
(Continued)

(58) Field of Classification Search
CPC .................................................. G06Q 10/1095
See application file for complete search history.

(56) References Cited

U.S. PATENT DOCUMENTS

| 7,644,144 B1 * | 1/2010 | Horvitz | G06Q 10/10 709/223 |
| 2009/0100433 A1 * | 4/2009 | Kang | G06F 3/061 718/103 |

(Continued)

FOREIGN PATENT DOCUMENTS

WO   WO-2010074740 A1 *  7/2010  .............. H04W 4/02

OTHER PUBLICATIONS

Chen, H. (2010). A dynamic priority assignment strategy for real-time task. 2010 International Conference on E-Health Networking Digital Ecosystems and Technologies (EDT). doi: 10.1109/edt.2010. 5496465 (Year: 2010).*

(Continued)

*Primary Examiner* — Matthew S Gart
*Assistant Examiner* — Tiera J Fletcher
(74) *Attorney, Agent, or Firm* — Tucker Ellis LLP (57) ABSTRACT

A method for arranging a meeting includes associating a first system with a first user and a second system with a second user, the systems each having a mobile communications device having a positioning system, and calendar software having stored calendar data or having access to calendar data stored elsewhere, defining in the first system, by the first user, a request for a meeting with the second user, sending the request to the second system, tracking the positions of the mobile communications devices of the first and the second systems, determining if a meeting is suitable by determining if the mobile communications devices are within a predetermined distance from each other, and if the first and second users are accessible for the meeting, notifying at least one of the first and second user that it has been determined that a meeting is suitable.

7 Claims, 4 Drawing Sheets

(51) Int. Cl.
*H04W 4/80* (2018.01)
*H04L 29/06* (2006.01)
*H04W 4/02* (2018.01)
*H04W 4/12* (2009.01)

(52) U.S. Cl.
CPC ....... *G06Q 10/1095* (2013.01); *H04L 65/403* (2013.01); *H04W 4/025* (2013.01); *H04W 4/12* (2013.01); *H04W 4/80* (2018.02)

(56) References Cited

U.S. PATENT DOCUMENTS

| | | | |
|---|---|---|---|
| 2011/0028132 A1 | 2/2011 | Bos | |
| 2012/0185291 A1* | 7/2012 | Ramaswamy | G06Q 10/1095 705/7.19 |
| 2012/0304187 A1* | 11/2012 | Maresh | G06Q 10/0631 718/103 |
| 2013/0096813 A1 | 4/2013 | Geffner | |
| 2014/0278673 A1* | 9/2014 | Wetzold | G06Q 10/1095 705/7.19 |
| 2015/0006221 A1* | 1/2015 | Mermelstein | G06Q 10/1095 705/7.19 |
| 2015/0142895 A1* | 5/2015 | Beran | G06Q 10/1095 709/206 |
| 2015/0220888 A1* | 8/2015 | Iyer | G06Q 10/1095 705/7.19 |
| 2015/0304121 A1 | 10/2015 | Wu | |
| 2016/0173436 A1* | 6/2016 | Koolwal | G06Q 50/01 709/206 |
| 2016/0253629 A1* | 9/2016 | Fonzi | H04W 4/021 705/7.19 |
| 2016/0364696 A1* | 12/2016 | Balasubramanian | G06Q 10/1095 |

OTHER PUBLICATIONS

International Search Report from counterpart International Patent Application No. PCT/IB2015/059660, dated Mar. 2, 2016.

* cited by examiner

METHOD FOR ARRANGING A MEETING AND A NON-TRANSITORY COMPUTER-READABLE RECORDING MEDIUM

RELATED APPLICATION DATA

This application is a continuation of International Patent Application No. PCT/IB2015/059660 filed Dec. 16, 2015, the disclosure of which is incorporated herein by reference in its entirety.

FIELD OF INVENTION

The inventions relates to a method for arranging a meeting.

The invention also relates to a non-transitory computer-readable recording medium having recorded thereon a program adapted to be executed on an electronic device having processing capabilities.

TECHNICAL BACKGROUND

There are different calendar systems and software solutions available on the market. The calendar systems typically allow a first user to send a request concerning a meeting to a second user. The request for a meeting typically includes a start time and an end time and optionally also includes resources and/or location. The second user typically has different options in responding to the request, such as accepting or declining or suggesting another time. The calendar system typically provides the possibility to handle the request and responses on a computer and/or on a mobile communications device. Also the calendar system typically provides the possibility to display the calendar and to get reminders or notifications on both a computer and/or on a mobile communications device.

However, there is still room for improvements.

SUMMARY OF INVENTION

It is an object of the invention to provide a method for arranging a meeting.

This object has been achieved by a method for arranging a meeting, the method comprising:
associating a first system with a first user, the first system comprising
  a mobile communications device comprising
    a positioning system for determining the position of the mobile communications device, and
    calendar software having stored calendar data or having access to calendar data stored elsewhere,
associating a second system with a second user, the second system comprising
  a mobile communications device comprising
    a positioning system for determining the position of the mobile communications device, and
    calendar software having stored calendar data or having access to calendar data stored elsewhere,
defining in the first system, by the first user, a request for a meeting with the second user,
sending, by the first system, the request to the second system,
tracking the positions of the mobile communications devices of the first and the second systems,
determining if a meeting is suitable
  by determining if the mobile communications devices of the first and the second systems are within a predetermined distance from each other, and
  by determining, based on the calendar data of the first system and the calendar data of the second system, if the first and second users are accessible for the meeting,
notifying at least one of the first and second user, via the system associated with respective user, that it has been determined that a meeting is suitable.

This method is especially suitable to arrange so-called ad-hoc meetings. The first user defines and sends a request to the second user that there is a need or desire for a meeting. The request is typically not specified with an exact time. The request is typically sent as a request for a meeting to be held when such a meeting is suitable.

By tracking the positions of the mobile communications devices of the first and the second systems it is possible to determine if the mobile communications devices of the first and the second systems are within a predetermined distance from each other and thereby, by assuming that the first and the second users actually carry their respective mobile communications device, determine that it is likely that the first and second users are within a predetermined distance from each other. By also checking the calendar data of the first and second systems to determine if the users are accessible, it is possible to determine that a meeting is suitable.

It may be noted that accessible does not necessarily mean that there is a completely open time slot in both users' calendars. Accessible or not may e.g. be associated with different prioritisations in one or both of the users' calendars.

By notifying at least one of the users that a meetings is determined as suitable, that user (or both users if both are notified) may decide to take the initiative to actually look up the other user to have the meeting.

It may be noted that the calendar software on respective mobile communications device may have calendar data actually stored on a memory of the mobile communications device. As an alternative to or as a complement thereto, the calendar data may be stored elsewhere, such as on a remote server. Typically the mobile communications device have calendar data stored in its memory covering a certain time span and communicates with the server according to an updating scheme to update the stored calendar data.

The second user may be uniquely identified in the request for a meeting. Alternatively, the request for a meeting may be sent to a group of users including said second user.

The request for a meeting may include information concerning an end time or end date for arranging the meeting.

The request for a meeting may include information concerning expected duration of meeting.

The request for a meeting may include information concerning requested or suggested prioritisation of the meeting.

The request for a meeting may include information concerning the predetermined distance. It may e.g. be useful to use different predetermined distances for different kinds of requests to different kinds of users or different resources.

The method may include updating the prioritisation based on time available before end date or end time.

In one embodiment, the tracking commences as soon as the request for a meeting has been sent by the first user.

The request for a meeting may relate to a meeting with additional users or attendees apart from the first and second user. In such a request the different users may be associated with different priorities, such as be being required or optional attendee.

The method may further comprise: sending, by the second system, from the second user, an acceptance of the request for a meeting, and in response to the sending of the acceptance commence said tracking the positions of the mobile communications devices of the first and the second systems. With this set-up, the tracking will commence only after the second user has accepted the request for a meeting.

If the request relates to a meeting with additional users or attendees apart from the first and second user it may in one embodiment be sufficient that one of the users accepts the request. If the different users are, in the request, associated with different priorities, such as be being required or optional attendee, it may e.g. be sufficient that the required attendee(s) have accepted the request for tracking to commence.

In one embodiment the first system only comprises the mobile communications device, and wherein the second system only comprises the mobile communications device.

In one embodiment the first system comprises a plurality of electronic communication devices with calendar software having stored calendar data or having access to calendar data stored elsewhere, wherein said plurality of electronic communication devices includes the mobile communications device, and wherein the second system comprises a plurality of electronic communication devices with calendar software having stored calendar data or having access to calendar data stored elsewhere, wherein said plurality of electronic communication devices includes the mobile communications device. In this embodiment, the respective system may e.g. comprise a computer and a mobile communications device. The first user may define and send the request on either one of the computer and the mobile communications device.

It may be noted that computer is an example of such an electronic communications device. It may be replaced with or complemented with other kinds of electronic communication devices, such as tablets, personal digital assistants (PDAs), smart watches, smart bracelets, wearable electronic communication devices.

The notifying may include notifying the first user, via the first system, that it has been determined that a meeting is suitable, and notifying the second user, via the second system, that it has been determined that a meeting is suitable. With this set-up, both users may take the initiative to actually meet. As an alternative, only the user(s) that have accepted the request is provided with a notification. This may also be combined with the above discussed request where a plurality of users is invited with different priorities (required/optional). For instance, the required attendees are notified and are also informed that the optional attendee(s) are nearby, but the optional attendees are not notified. This may also be combined with other kinds of prioritisations concerning the perceived importance of the meeting. For instance, for highly prioritised meetings all attendees are notified but for less prioritised meetings only the required attendees are notified.

The mobile communications devices may be cell phones.

It may be noted that the request for a meeting may also include a request to or for a resource. This resource may be a uniquely specified resource, such as a specific conference room or may be specified from a group of resources. The group of resources may e.g. be based on a property, such as being a conference room or being a projector.

It is e.g. conceivable that the request for a meeting includes a request to a second user as a required attendee, a request for a third user as an optional attendee and a request for a suitable conference room (within a predetermined distance from the positions of the first and second mobile communication devices) once it has been determined that a meeting is suitable.

It is also an object of the invention to provide a program for implement in the above method.

This has been achieved by a non-transitory computer-readable recording medium having recorded thereon a program which, when executed on a mobile communications device having
 processing capabilities,
 a positioning system for determining the position of the mobile communications device, and
 calendar software having stored calendar data or having access to calendar data stored elsewhere,
is arranged for implementing:
defining, by a first user, a request for a meeting with a second user,
sending the request to a second system being associated with the second user,
tracking the position of mobile communications device, communicating directly or indirectly with a second mobile communications device, which is included in the second system and which position is tracked,
determining if a meeting is suitable
 by determining if the mobile communications device is within a predetermined distance from the second mobile communications device, and
 by determining, based on calendar data of or accessible by the mobile communications device and the calendar data of the second system, if the first and second users are accessible for the meeting,
notifying the first user, via the mobile communications device, that it has been determined that a meeting is suitable.

BRIEF DESCRIPTION OF THE DRAWINGS

The invention will by way of example be described in more detail with reference to the appended schematic drawings, which shows a presently preferred embodiment of the invention.

DETAILED DESCRIPTION OF PREFERRED EMBODIMENTS

Figure 1:
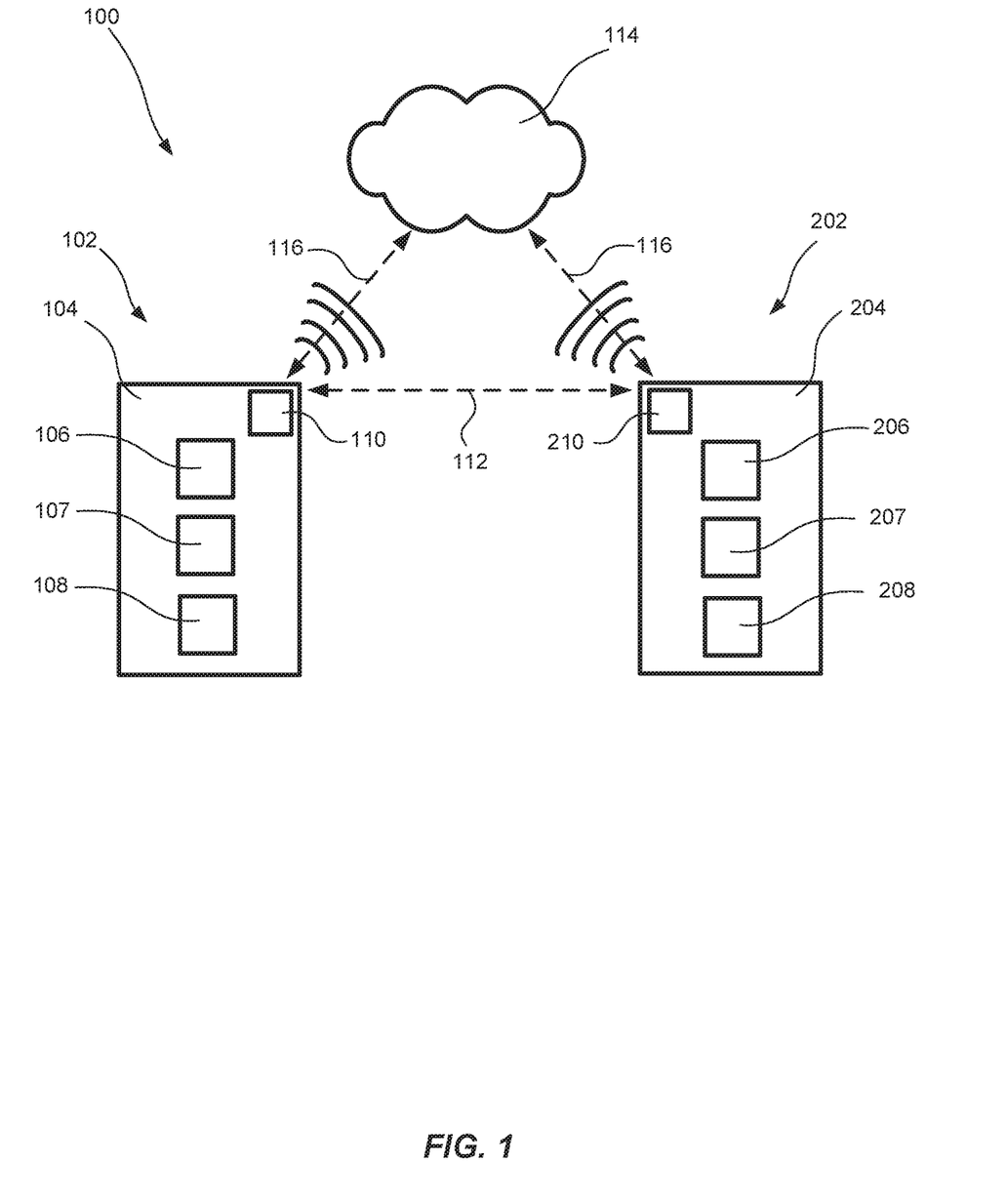
FIG. 1 is a schematic drawing of a first and a second system.
Figure 4:
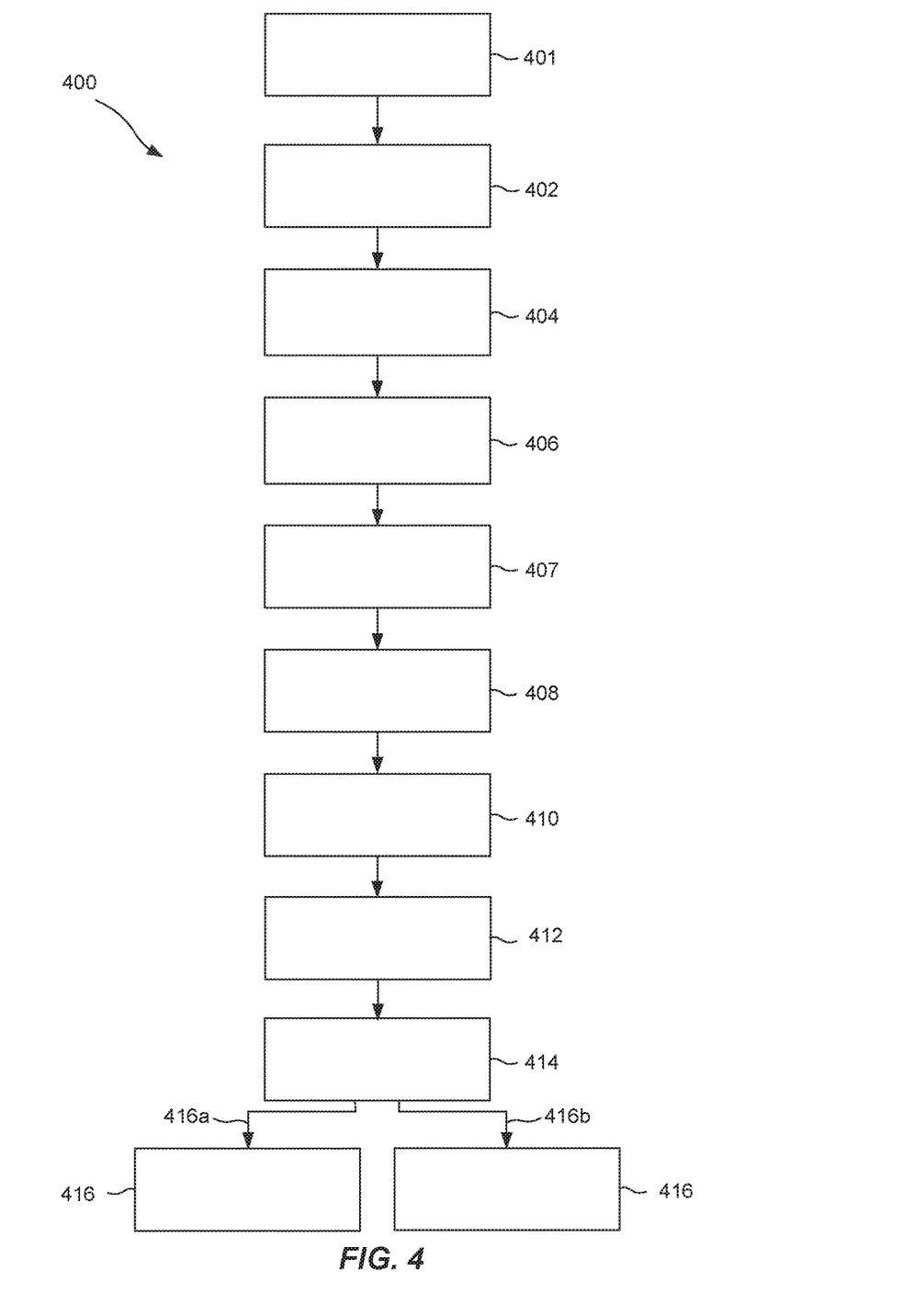
FIG. 4 is a flow chart illustrating a method for arranging a meeting.

A method for arranging a meeting will in the following be discussed with reference to FIGS. 1 and 4. FIG. 1 illustrates a first system 102 and a second system 202 used by a first and a second user, respectively, in the arrangement 100 of a meeting between the first and the second user. The method 400 for arranging the meeting is correspondingly illustrated in FIG. 4.

In FIG. 1, the first system 102 has been associated 401 with the first user and the second system 202 has been associated 402 with the second user. The first system 102 comprises a mobile communications device 104 and the second system 202 comprises a mobile communications device 204.

The mobile communications device 104 comprises a positioning system 106, a memory 108, and a communication unit 110. The mobile communications device 204 also comprises a positioning system 206, a memory 208, and a communication unit 210.

The positioning systems 106 and 206 are arranged to determine the respective positions of the mobile communications devices 104 and 204.

The memories 108 and 208 are arranged to store a calendar software having stored calendar data or having access to calendar data stored elsewhere, as will be described further below.

The mobile communications device and/or the electronic communication devices comprise a processor 107, 207 which may include any type of processor or microprocessor that interprets and executes instructions, especially any instructions in the calendar software.

The memory 108, 208 may be a non-transitory memory for storing software and/or storing calender data. It may include a random access memory (RAM) or another dynamic storage device that stores information and instructions for execution by a processor. The memory 108, 208 may also be used to store temporary variables or other intermediate information during execution of instructions by a processor.

The calendar data may be in the form of calendar software. The calendaring software comprises software that that provide a user with an electronic version of a calendar. The calendar software may also comprise an appointment book, address book, and/or contact list. The calendar software may be a local software package designed for individual use, e.g., Microsoft Outlook without Exchange Server, or Windows Calendar) or may be a networked software package that allows for the sharing of information between users (e.g. Windows Live Calendar, Google Calendar, or Microsoft Outlook with Exchange Server). Hence, the calendar software may be used to manage the time schedule of a user. The calendar software of a device, such as the mobile communication device, may be sychronised with one or several online accounts that include calendars, for example, Google™ or Xperia™ Facebook.

The communication units 110 and 210 are adapted to establish at least a communications link between the mobile communications devices 104 and 202. The communications link may be directly from device to device as indicated by line 112 in FIG. 1 or via a cloud service 114 as indicated by lines 116 in FIG. 1. When using a cloud service 114, information may also be retrieved from a further unit (not shown) also in communication with the cloud service via another communications link (not shown).

Next a call for and a recommended circumstance for the meeting will be described. The user of the first mobile communications device 104 may in order to arrange the meeting define 404, in the first system 102, a request for the meeting with the second user. The request is then sent 406, by the first system 102 to the second system 202 via the communications link.

The communication unit 110, 210 includes a transceiver that enables communication with other devices and/or systems. For example, the communication units 110 and 210 may include hardware and mechanisms for communicating via a network, such as a wireless network. The communication units 110, 210 may include a radio frequency (RF) transmitter and receiver and one or more antennas for transmitting and receiving RF data.

The communication unit 110, 210 may provide wireless communication for exchanging data over short distances such as Bluetooth, and Near field communication (NFC).

The positions of the mobile communications devices of the first 102 and the second 202 systems are tracked 408 utilizing the respective positioning systems 106 and 206 of the mobile communications devices 104 and 204. To determine 410 if a meeting is suitable, it is determined 412 if the mobile communications devices 104, 204 of the first 102 and the second 202 systems are within a predetermined distance from each other, and determined 414, based on the calendar data of the first system 102 and the calendar data of the second system 202, if the first and second users are accessible for the meeting. If the meeting is determined 410 as suitable at least one of the first and second user is notified 416, via the system 102, 202 associated with respective user, that it has been determined 410 that a meeting is suitable. More specifically, the notifying 416 may include notifying 416a the first user, via the first system 102, that it has been determined 410 that a meeting is suitable, and notifying 416b the second user, via the second system 202, that it has been determined 410 that a meeting is suitable.

The method 400 may further comprise sending 407, by the second system 202, from the second user, an acceptance of the request for a meeting, and in response to the sending of the acceptance commence the tracking 408 the positions of the mobile communications devices 104, 204 of the first 102 and the second 202 systems.

The arrangement 100 and method 400 has been described such that the first system 102 only comprises the mobile communications device 104, and the second system 202 only comprises the mobile communications device 202. The person skilled in the art realizes that the systems 102 and 202 may comprise additional electronic devices.

Figure 2:
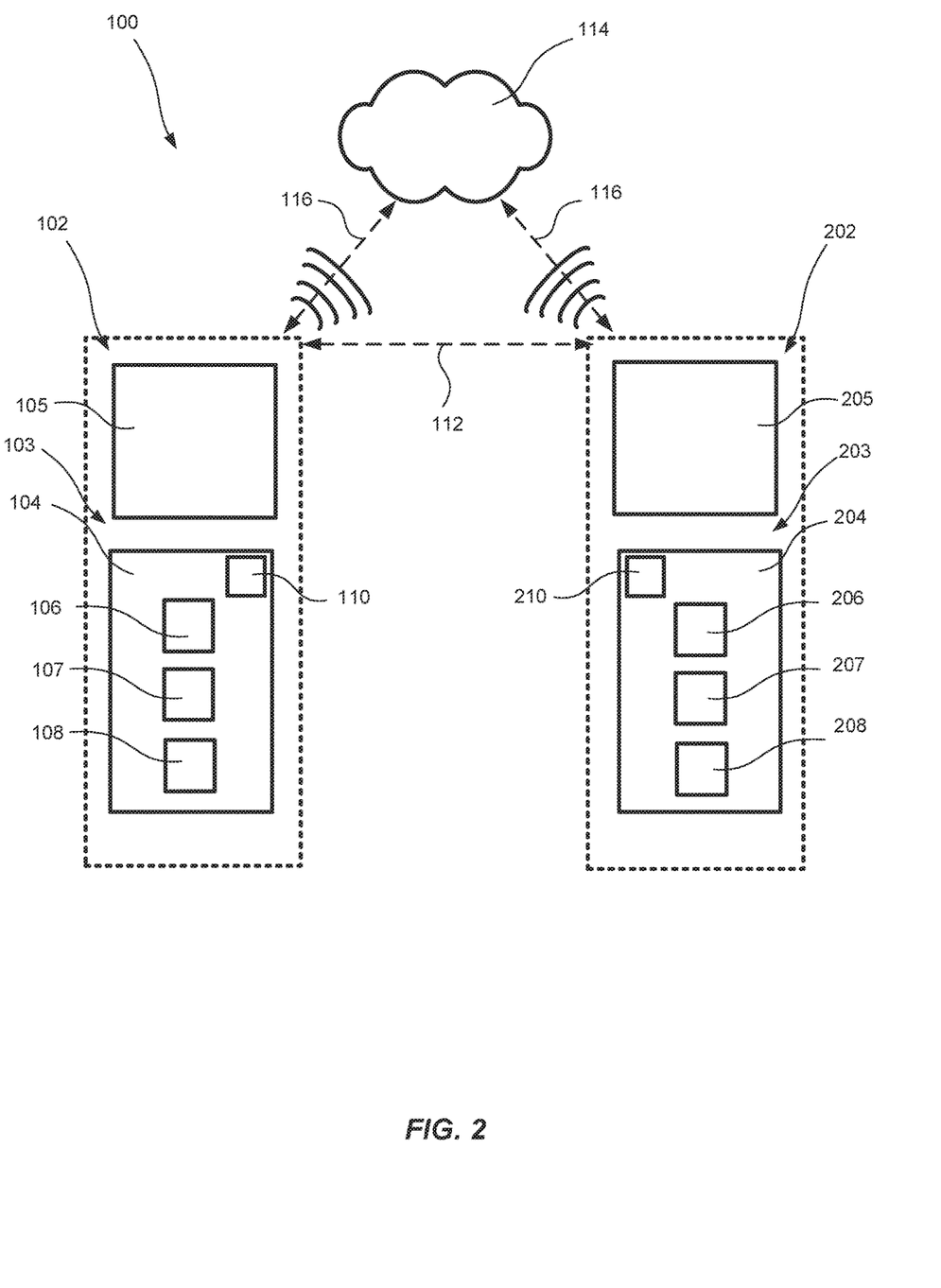
FIG. 2 is a schematic drawing of a first and a second system

FIG. 2 illustrates such an embodiment, wherein the first system 102 comprises a plurality of electronic communication devices 103, including the mobile communications device 104. To this end, the second system 202 comprises a plurality of electronic communication devices 203 including the mobile communications device 204.

In this embodiment, the first user may use another of the electronic communications devices to send the request. This another device may e.g. be a computer 105. This computer 105 may communicate over a cloud service 114 with the second system 202. In this second system 202, there may also be computer 205. The second user may use the computer 205 or the mobile communications device 204 to accept the request for a meeting.

The plurality of electronic communication devices 203 electronic communication devices 203 have calendar software having stored calendar data or having access to calendar data stored elsewhere. Hence, the computers 105 and 205 may have calendar software having stored calendar data or having access to calendar data stored elsewhere.

In the disclosed embodiments, the mobile communications devices 104, 204 disclosed are cell phones.

The positioning system 106, 206 may, for example, utilize a satellite communication, such as a global positioning system (GPS), for determining the respective positions of the mobile communications devices 104 and 204.

The positioning system 106, 206 may, alternatively or as a complement thereto utilize indoor positioning systems (IPSs), WiFi-location, visual light communication (VLC), smartphone sensors such as Bluetooth, Radio-frequency identification (RFID) or Near-field communication for determining the respective positions of the mobile communications devices 104 and 204.

Figure 3:
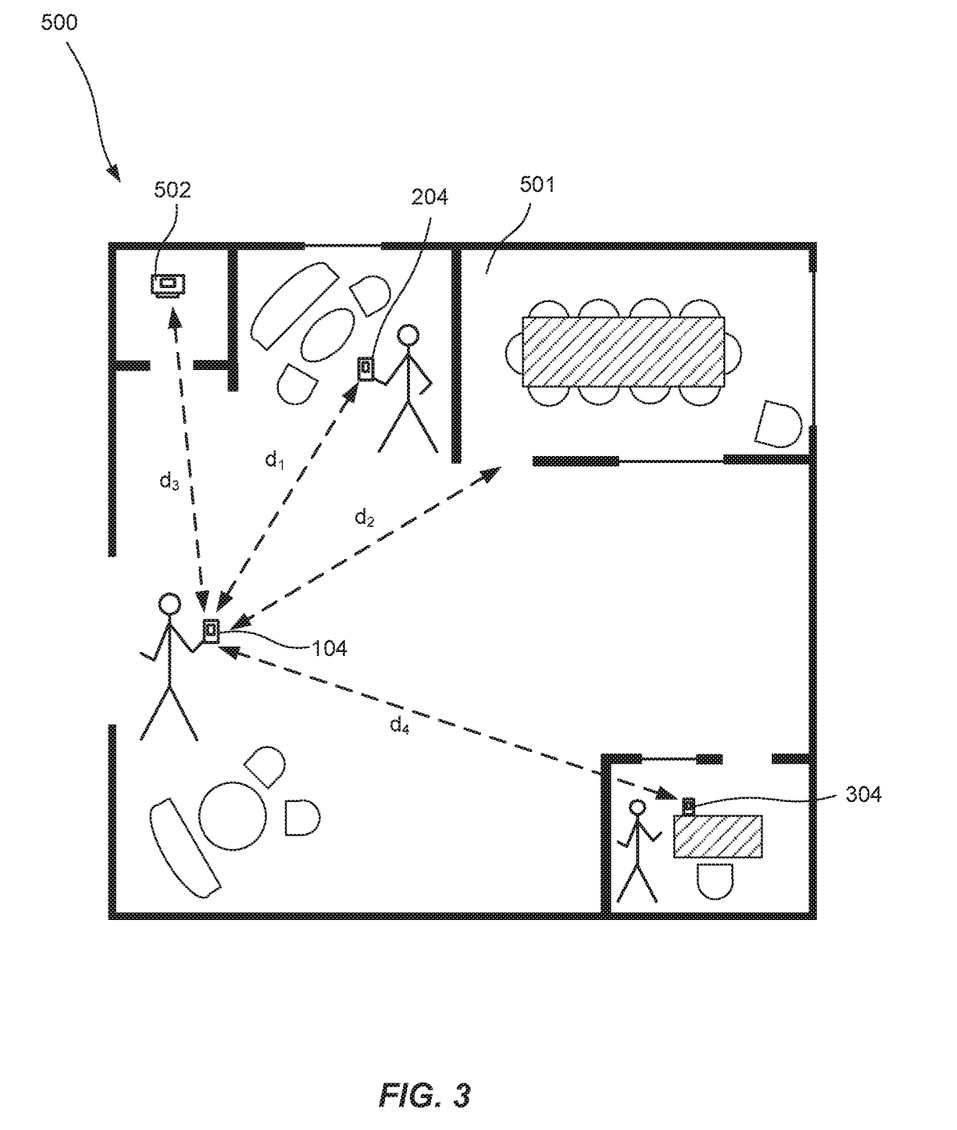
FIG. 3 is a schematic drawing showing a plurality of users in an office space.

The applicability in real life may be illustrated as shown in FIG. 3. The first user has previously sent a request for a meeting and the second user has accepted the request.

Therefore tracking of the positions of the first mobile communications device 104 and the second mobile communications device 204 has commenced. For instance, when the first user enters into an office space 500, the distance between first mobile communications device 104 and the second mobile communications device 204 is determined to be within a distance $d_1$ from each other. If this is determined to be within a predetermined distance from each other the software of respective system 102, 202 also checks the calendar data whether respective user is accessible. If this is true, both users are notified on their respective mobile communications device 104, 204. Both users may then take the initiative to actually meet with the other.

In the example of FIG. 3, the first user has also indicated in the request that there is a need for a conference room. The distance $d_2$ to a conference room 501 is determined and the calendar data associated with the conference room 501 is checked to see if the conference room 501 is accessible for the complete expected time of duration or for a predetermined sufficient part of the expected time of duration. The selection of conference room may e.g. be related to the proportion of time available versus the relative distance between the closest conference room 501 and the second closest conference room being available for a longer time (or the complete expected duration). The user(s) are notified about the presence of a suitable conference room 501.

Similarly, the distance $d_3$ to other kinds of resources 502, such as a computer, a projector, etc, may be determined and if determined to be within a predetermined distance the presence of the resource is notified to the user(s).

In the example shown in FIG. 3 it is also contemplated that the first user has invited the second user as a required attendee and a third user has been invited as an optional attendee. When it has been established that it is suitable with a meeting between the first and second users, the third user may be notified via its mobile communications device 304. This notification may be dependent upon if the distance $d_4$ between the first and the third mobile communications device 304 is determined to be within a predetermined distance. If the third user is too far away it may be decided that there is no need to send a notification.

It may in this context be noted that the predetermined distances may be different between e.g. the first and second user compared to the predetermined distance between the first user and the third user and or the predetermined distance between the first user and any of the resources or conference rooms.

It is contemplated that there are numerous modifications of the embodiments described herein, which are still within the scope of the invention as defined by the appended claims.

It may e.g. be possible to set up rules concerning working hours and non-working hours, and wherein the requests may be associated to working hours and/or non-working hours.

It may e.g. also be possible to set up rules concerning lunch time where there is no tracking active. At a large company with a central canteen it may e.g. be undesirable that all requests results in a notification during lunch time. This may also be combined with the above discussed prioritisation, such that highly prioritised requests are notified also during lunch time.

The invention claimed is:

1. A method for arranging an ad-hoc meeting, the method comprising:
   associating a first system with a first user, the first system comprising
      a first mobile communications device comprising
         a positioning system for determining the position of the mobile communications device, and
         calendar software having stored calendar data or having access to calendar data stored elsewhere:
   associating a second system with a second user, the second system comprising
      a second mobile communications device comprising
         a positioning system for determining the position of the mobile communications device, and
         calendar software having stored calendar data or having access to calendar data stored elsewhere:
   defining in the first system, based on input by the first user, a request for a meeting with the second user that includes an end date by which the meeting with the second user should occur and a prioritization for the meeting, wherein the request for the meeting does not specify a start time of the meeting, and wherein the request for the meeting indicates a request for a conference room;
   sending, by the first system, the request to the second system;
   tracking the positions of the mobile communications devices of the first and the second systems;
   determining, based on the tracking, that the mobile communications devices of the first and the second systems are within a predetermined distance from each other and that the mobile communications devices of the first and the second systems are within a predetermined distance from an available conference room;
   determining, based on calendar data of the first system, calendar data of the second system, the prioritization associated with the meeting, a time available until the end date, and calendar data associated with the available conference room, that the first and second users are accessible for the meeting and that the available conference room is accessible for the meeting, wherein a priority for the meeting increases as the time available until the end date decreases;
   based on the determination that the mobile communications devices of the first and the second systems are within a predetermined distance from each other, the determination that the first and second users are accessible for the meeting, and the determination that the available conference room is accessible for the meeting, determining that the current time is a suitable time for the meeting; and
   upon the determination that the current time is a suitable time for the meeting, sending a notification to at least one of the first user and the second user, via the system respectively associated with the first user and the second user, that the meeting is suitable at the current time, and that the available conference room is accessible for the meeting.

2. The method according to claim 1, further comprising:
   sending, by the second system, from the second user, an acceptance of the request for a meeting, and in response to the sending of the acceptance commencing said tracking the positions of the mobile communications devices of the first and the second systems.

3. The method according to claim 1, wherein the first system only comprises the first mobile communications device, and wherein the second system only comprises the second mobile communications device.

4. The method according to claim 1, wherein the first system comprises a plurality of electronic communication devices with calendar software having stored calendar data or having access to calendar data stored elsewhere, wherein said plurality of electronic communication devices includes the mobile communications device, and wherein the second system comprises a plurality of electronic communication devices with calendar software having stored calendar data or having access to calendar data stored elsewhere, wherein said plurality of electronic communication devices includes the mobile communications device.

5. The method according to claim 1, wherein said notifying includes notifying the first user, via the first system, that it has been determined that a meeting is suitable at the current time, and notifying the second user, via the second system, that it has been determined that a meeting is suitable at the current time.

6. The method according to claim 1, wherein the first and second mobile communications devices are cell phones.

7. A non-transitory computer-readable recording medium having recorded thereon a program which, when executed on a first mobile communications device having processing capabilities, a positioning system for determining the position of the mobile communications device, and calendar software having stored calendar data or having access to calendar data stored elsewhere, is arranged for implementing:

defining, based on input by a first user, a request for a meeting with a second user that includes an end date by which the meeting with the second user should occur and a prioritization for the meeting, wherein the request for the meeting does not specify a start time of the meeting, and wherein the request for the meeting indicates a request for a conference room;

sending the request to a second system that is associated with the second user;

tracking the position of the first mobile communications device;

communicating directly or indirectly with a second mobile communications device, which is included in the second system and which position is tracked;

determining, based on the tracking, that the first mobile communications device is within a predetermined distance from the second mobile communications device, and that the first mobile communication device and the second mobile communication device is within a predetermined distance from an available conference room;

determining, based on calendar data of or accessible by the first mobile communications device, calendar data of the second system, the prioritization associated with the meeting, a time available until the end date, and calendar data associated with the available conference room, that the first and second users are accessible for the meeting, and that the available conference room is accessible for the meeting;

based on the determination that the first mobile communications device is within a predetermined distance from the second mobile communications device, the determination that the first and second users are accessible for the meeting, and the determination that the available conference room is accessible for the meeting, determining that the current time is a suitable time for the meeting; and upon the determination that the current time is a suitable time for the meeting, sending a notification to the first user, via the first mobile communications device, that the meeting is suitable at the current time, and that the available conference room is accessible for the meeting.

* * * * *